Feb. 14, 1961  A. CORDIER  2,971,483
WORK FEED CONTROL FOR SEWING AND THE LIKE MACHINES
Filed Jan. 7, 1958  2 Sheets-Sheet 1
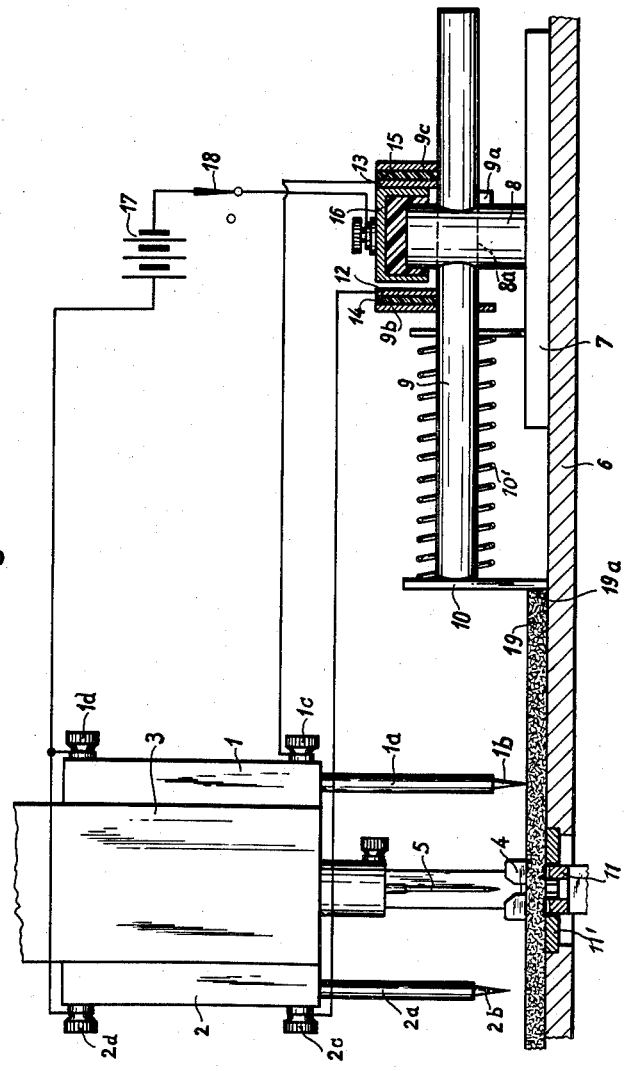
INVENTOR.
ANDRÉ CORDIER
BY
ATTORNEY Feb. 14, 1961            A. CORDIER            2,971,483
WORK FEED CONTROL FOR SEWING AND THE LIKE MACHINES
Filed Jan. 7, 1958            2 Sheets-Sheet 2
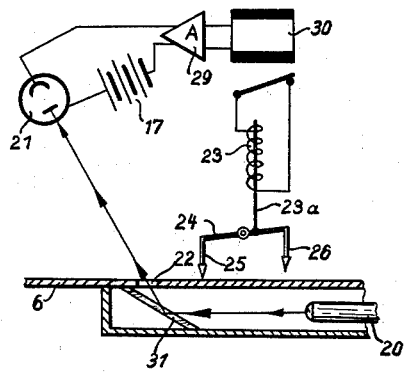
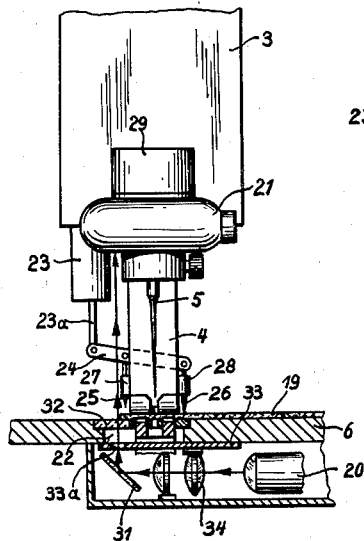
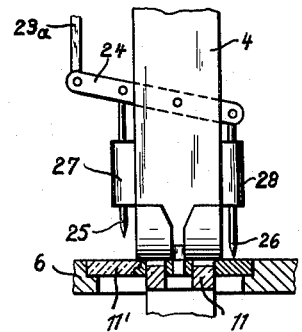
INVENTOR.
ANDRÉ CORDIER
BY
ATTORNEY > United States Patent Office 2,971,483
Patented Feb. 14, 1961

2,971,483
WORK FEED CONTROL FOR SEWING AND THE LIKE MACHINES

André Cordier, Bordeaux, France
Filed Jan. 7, 1958, Ser. No. 707,574
Claims priority, application France Jan. 8, 1957
9 Claims. (Cl. 112—205)

The present invention relates to work feed control for machines having means, such as the feed dog mechanism of a sewing or the like machine, to effect a normally linear automatic work feed or advance of a work piece being operated on past an operating point (needle) upon a working surface.

A general object of the invention is the provision of an improved automatic work feed control system, to compensate for or correct deviations from the linear feed movement, such as due to outside interference, on the one hand, as well as to effect an automatic work feed control in any desired direction or along a predetermined curved line or trace, in particular the contour of the work or the contour of a separate controlling member or template.

Although the invention, as herein described, is of special use in connection with sewing and the like machines for stitching a desired seam or pattern parallel to the contour of a work piece, such as in connection with hemming, binding, overcasting, over-and-over stitching and the like operations, it will be evident that the underlying concept and basic principle of the invention are susceptible of numerous other uses and will apply generally to any type of machine wherein a work piece is normally continuously or intermittently fed past an operating point or tool.

Accordingly, a further object of the invention is the provision of an improved control system for machines equipped with normally linear work feed control means, which will enable to automatically maintain a work piece to be fed upon a linear feeding line or path, substantially free from incidental deviations from said line due to outside causes or interference.

Another object of the invention is the provision of an improved system of automatic work feed control for machines having means for effecting a normally linear work feed, which will enable the work to be advanced automatically according to a desired curved feed path or trace.

Another object of the invention is the provision of an automatic work feed control system of this type suitable especially, though not limitatively, for use with sewing or the like machines having feed mechanism for effecting a normally linear work feed, whereby to enable the work to be fed automatically along a line conforming to the edge or contour of the work.

Yet another object of the invention is the provision of an automatic work feed control system suitable especially, though not limitatively, for use in connection with sewing or the like machines having feed mechanism for effecting a normally linear work feed, whereby to enable the work to be fed along a desired curve or trace determined by the contour of the work and/or of a separate control member or template, respectively.

Another object of the invention is the provision of automatic work feed control mechanism of the above type which is both simple in construction as well as efficient and reliable in operation and which may be structurally incorporated in a conventional sewing or the like machine, without requiring any basic changes in the design or construction of the machine.

The invention, both as to its further objects and novel aspects, will be better understood from the following detailed description taken in reference to the accompanying drawings, forming part of this specification and wherein:

Fig. 1 shows a work feed control system constructed in accordance with the principles of the invention and embodied in a conventional sewing or the like machine, the arrangement shown utilizing a mechanical contact device or scanning element to control the work relative to the feed direction of the machine;

Fig. 2 is a schematic diagram of a modified work feed control system according to the invention, utilizing a photoelectric or the like pick-up device to control a work piece in relation to the feed direction of the machine;

Fig. 3 is a front view of work feed control apparatus according to Fig. 2 shown structurally embodied in a sewing machine; and Fig. 4 is a fractional view, shown on an enlarged scale, of Fig. 3.

Like reference numerals denote like parts in the different views of the drawings.

With the foregoing and ancillary objects, in view as will appear hereafter, the invention is predicated basically on the following thought and principle.

In the conventional sewing machine, the work or sewing material (cloth, fabric, etc.) is fed past the needle or stitching point by the action of the feed dog mechanism and along a normally straight line passing through said needle and determining the stitching direction or seam being produced. If the work is temporarily held stationary relative to the supporting surface or cloth plate at a point or pivot adjacent to the needle or line of feed, while the machine continues to operate, the work will be caused to rotate or to describe a circle having said point as a center or pivot.

Accordingly, according to one embodiment of the present invention, there are provided on opposite sides of the work feed line, adjacent to or laterally of the needle and on a line at right angle to said feed line, a pair of retractable members having impaling points and control means therefor to place the work in any relative position with respect to the stitching direction or feed line of the machine for the sewing or stitching of curves and/or to automatically maintain the stitching direction upon a straight line or trace, independently of incidental deviations due to outside interference, etc. The operation of the retractable impaling members may be effected by means of a pair of electromagnets or solenoids being controlled by a scanning device, such as a mechanical feeler, cam follower or the like, to operate a pair of electric switches or relays connected in the circuits of the solenoid windings. The feeler or equivalent scanning device may cooperate directly with or engage the edge or contour of the work or it may be controlled by a separate template or equivalent control member.

The use of a mechanical contact finger or feeler to control the impaling members directly by the edge or contour of the work presupposes a relatively rigid work piece such as of leather, felt or the like material. Alternatively, a separate control element in the form of a template may be used for the control of the work.

According to another embodiment, the mechanical scanning element may be replaced by a photoelectric, capacitative or the like pick-up or scanning device cooperating with or being controlled by the edge or contour of the work piece and being adapted to produce an electric current for the operation of one or two solenoids controlling said impaling members.

More specifically, in the case of a photoelectric control, the light beam emitted by a suitable source (light bulb, etc.) mounted below the base or working surface of the machine may be passed through a light slit in said surface adjacent to the needle and laterally of the work feed line of the machine, said slit being intercepted or variably covered by the edge or contour of the work piece upon deviation of the work contour or tangent from a direction parallel to the feed direction of the machine, that is, depending upon the shape or configuration of said contour, in such a manner as to vary the cross sectional area of the light beam which is impinged upon a photoelectric cell. The photoelectric current may have an intermediate value upon covering of about one half of the light slit by the work in case of a straight contour or contour tangent being parallel to the feed direction of the machine, to cause a relay in the output circuit of the photoelectric cell to assume in a neutral position between two working contacts. If the work contour deviates from a straight line in either direction (convex or concave curvature, respectively) or if the feed direction changes due to outside interference, the cross-sectional area of the light beam passed by said slit will be increased or decreased or the slit uncovered or covered, respectively, to cause more or less light to be impinged upon the photoelectric cell. This will result in closing of either of the relay contacts, to operate one of the solenoids and impaling members and to cause the work to rotate in either clockwise or anticlockwise direction. Such a control system may serve both to compensate for deviations from a linear work feed by instantly correcting incidental deviations due to outside interference and other causes. Moreover, the system may be used to positively control the work position, such as in accordance with the shape of the edge or contour of the work, especially in carrying out hemming, binding, overcasting or the like stitching operations. In either case, the system causes the stitching line or seam to automatically follow the contour of the work, in such a manner as to correct for incidental deviations in case of a straight contour or to cause the seam to follow the contour as in hemming or the like stitching operations. Alternatively, the seam may be controlled by a separate element or template of predetermined shape or configuration.

Referring more particularly to Fig. 1, the numerals 1 and 2 represent a pair of electromagnets or solenoids mounted at opposite sides of the head 3 of a conventional sewing machine, said magnets being positioned upon a line forming a right angle with the feed direction or stitching line passing through the needle and being perpendicular to the plane of the drawing. Further mounted in conventional manner upon the head 3 is a presser foot 4 and a reciprocating needle 5. The plungers or armatures 1a and 2a of the electromagnets 1 and 2 terminate in impaling points 1b and 2b and may be lowered to engagement with the work 19 upon energization of the solenoid windings, as shown for the armature 1a and point 1b in the drawing, while deenergization of the solenoid windings causes a retraction or raising of the armatures to disengaged position from the work by the action of suitable return springs (not shown), as shown for the armature 2a and point 2b in the drawing.

Mounted upon the table top 6 or work supporting surface of the machine is a mechanical contact or scanning device controlled by the shape or contour 19a of the work 19 which may be a piece of cloth, fabric or the like. The work piece 19 may be fed or advanced in the feed direction of the machine, that is, at right angle to the plane of the drawing, by any suitable means, such as a conventional feed dog mechanism 11 mounted within and below the cloth plate 11′. More particularly, the control device shown comprises a base plate 7 supporting a post or upright 8, the latter being provided with a horizontal bore 8a having mounted therein a sliding control rod 9. Attached to one end of the rod 9 is a feeler or contact finger 10 resiliently engaging the edge 19a of the work 19 by the action of a coil spring 10′ urging the rod 9 and finger 10 in a direction towards the work 19. A stop 9a engaging the post 8 serves to limit the movement of and to prevent the rod 9 from being pushed out of the bore 8a.

Further secured to the rod 9 at opposite sides of the post 8 are a pair of lugs or pins 9b and 9c each carrying a contact 12 and 13 insulated from said pins by non-conducting spacing members or sheets 14 and 15, respectively.

The contacts 12 and 13 facing one another cooperate with a further contact 16 insulatingly secured to the top of the post 8. Contact 15 is connected via a control switch 18 and battery 17 or the like current source to both input terminals 1d and 2d of the solenoids 1 and 2, the cooperating terminal 1c of solenoid 1 being connected to contact 13 and the opposite terminal 2c of solenoid 2 being connected to contact 12 of the scanning device.

As a result, upon closing of the switch 18, the electromagnet 1 is energized by closing of the contacts 13 and 16, as shown in the drawing, causing a lowering of the armature 1a and impaling point 1b upon the work 19 and rotation of the latter about the point 1b as a center. At the same time, contacts 12 and 16 are in open position that is, the solenoid 2 is deenergized and the armature 2a and impaling point 2b are in raised or disengaged position from the work 19, as shown. If the finger 10 and rod 9 are now displaced towards the right against the action of the spring 11, the contacts 13 and 16 will be interrupted, whereby both solenoids 1 and 2 are deenergized and both impaling points 1b and 2b are in a raised position or disengaged from the work 19. Upon continued displacement of the rod 9 and finger 10, contacts 12 and 16 will be closed, causing energization of the solenoid 2 and lowering of impaling points 2b to a position engaging the work 19.

The contacts 12 and 13 are advantageously adjustable, to enable an adjustment of the control device for optimum accuracy or work feed control.

In operation, the work 19, such as a piece of felt having a curved edge or contour 19a is positioned upon the work table 6 in such a manner as to cause the finger 10 to engage the contour 19a, while the rod 9 is in its intermediate position, that is, without engagement of either of the contact pairs 16 and 13 or 16 and 12, respectively. This may correspond to the position where the tangent of the curve, or in the case of a straight contour, the direction of the straight edge of the work is parallel to the feed direction of the machine. The sewing machine is now started, thus initiating the work feed by the feed dog mechanism. In case of deviation from the linear feed or change in contour of the work, the latter is instantly controlled or corrected due to the fact that the finger 10 continuously engages the edge 19a by the action of the spring 11, thus, causing, for instance, the rod to be displaced by an outwardly curved contour to a position where the contacts 13 and 16 are closed, as shown in the drawing, resulting in energization of the electromagnet 1 and lowering the impaling points 1b to work engaging position. As a result, the work piece is caused to rotate in counterclockwise direction about the point 1b. The effect of this rotation is that the rod 9 will be pushed back against the action of spring 11, resulting in disengagement of the contacts 13 and 16 and closing of the contacts 12 and 16 if the work contour is curved in the opposite direction. As a result, the point 2b is now lowered to work engaging position and the point 1b raised to its inoperative or disengaged position. In other words, the tendency of the control device is to return to or maintain a neutral position of the contact 16 between the contacts 12 and 13, that is, with both pivots 1b and 2b being in their raised position, in such a manner as to result in an automatic control of the feeding direction of the work piece 19 so as to substantially coincide with the configuration of the contour for both straight, convex and concave variations of the contour configuration, this control being effective throughout the periphery of the contour or edge 19a of the work piece 19.

As a result, by an automatic control device as described, the seam stitched by the needle 5 is caused to conform to the edge 19a of the work 19 independently of any deviation of a straight contour from the direction parallel to the feed direction of the machine, due to outside interference, while causing the seam to automatically follow a varying contour 19a of the work or of a separate control member, respectively. In general, the automatic control tends to maintain a parallel relation between the tangent of the work contour 19a at the point of contact with the feeler 10 with the feed direction of the work.

It has been found, that the impaling point 1b and its associated control mechanism may be dispensed with in that the feeler 10 acts as a pivot to cause a rotation of the work in the same direction. This is due to the fact that, in case of an outward curvature, the edge 19a of the work is urged into continuous resilient contact with the finger 10 by the action of the spring 11, whereby to result in a pivot action on the work, in the same manner as by the point 1b, while, with the edge 19a being curved in the opposite or inward direction, the edge 19a tends to recede or become disengaged from the finger 10, resulting in a relaxation of the spring pressure by the finger 10 and the edge 19a.

As is seen from the foregoing, a sewing machine equipped with a control device of the type according to the invention may be operated without any manipulation on the part of the operator, provided the work piece 19 is of sufficient thickness or has a sufficient rigidity to effect a displacement of the contact finger 10. If the machine is furthermore provided with some kind of automatic stop motion means effective at the end of a complete stitching operation, a number of machines may be attended to or supervised by a single operator.

While a feed control device of the type described is especially suitable for hemming, binding, over-and-over stitching and the like operations, its usefulness is not limited thereto and applies generally to any type of normally linear work feed to be controlled either manually or automatically.

If the contour of the work piece is a closed curve or if the curvature is in a single (outward) direction only, a single electromagnet and impaling member may be provided, such as in stitching shoe soles or the like work pieces.

According to the embodiment shown by Figs. 2 to 4, the control device according to the invention comprises a light source 20 mounted underneath the support or table top 6 of the machine, a photoelectric cell 21 which may be mounted upon the head 3 as shown in Fig. 3 and a light slit 22 provided in the top or work supporting surface 6 through which is passed a light beam emitted by said source via a deflecting element, such as a prism or mirror 31. Although the arrangement shown in Figs. 2 to 4 may comprise a pair of solenoids or electromagnets operating a pair of pivots as shown in Fig. 1, only a single balanced electromagnet 23 is provided in the modification of Figs. 2 to 4, being controlled by the output current of the photoelectric cell 21 and having an armature 23a pivotally connected to one of the lever arms of a double lever 24 rotatable about its center and provided with a pair of impaling members or points 25 and 26 at the extreme ends thereof. The lever 24 may be mounted upon the presser foot 4, as shown in the drawing, and the members 25 and 26 may be provided with suitable guides 27 and 28 also mounted upon the presser foot. As a result, the pivots 25 and 26 are closely adjacent to the needle 5, to result in relatively small instantaneous deviations of the work feed direction and, in turn, in an increased accuracy of the feed control in automatically following the contour of the work piece 19.

The output current of the photoelectric cell supplied by a battery or the like 17 may be suitably amplified by means of a vacuum tube, transistor or equivalent amplifier 29 followed by a control relay 30, the output or working circuit of which includes the solenoid winding 23.

In the interest of compactness and in order to save space, the light source 20 may be a tubular light bulb mounted in a horizontal position shown, the light emitted by said bulb being concentrated by a condenser or equivalent optical system 34 into a beam which is deflected by the mirror 31 onto the sensitive surface of the photoelectric cell 21.

In an arrangement of this type, if the work piece 19, such as a piece of cloth fabric, etc., being automatically advanced along a straight line by the feed mechanism of the machine, that is, at right angle to the plane of the drawing deviates from the correct feeding line, this will result in a displacement of the edge of the work 19 upon the light slit 22, thus covering or uncovering said slit and interrupting and setting up the current flow through the photoelectric cell 21. This in turn causes either of the impaling members 25 and 26 to be operated into work engaging position, thus rotating and causing the work to return to its original position relative to the feed direction of the machine.

More specifically, the armature 23a may be urged, by a spring or the like (not shown), into a position with one of the impaling members or points 25 and 26 engaging the work 19, such as the pivot 26 as shown in Fig. 3, in which case the slit 33a is fully covered by the edge of the work and the output current of the photoelectric cell is equal to zero. If now the slit becomes uncovered due to rotation of the work by the action of pivot 26, the magnetic force of the solenoid overcomes the spring pressure, whereby to move lever 24 to a position with the point 25 engaging the work 19 and causing the latter to rotate in the opposite direction. Again, with a predetermined photoelectric current corresponding to one half of the slit 33a being covered by the work and with the edge or tangent of the work contour being parallel to the feed direction of the machine, the lever 24 may be held in a neutral position with neither point 25 or 26 engaging the work 19, in a such a manner that by a total covering or uncovering of the slit by the work contour, the lever 24 will be operated by the solenoid into a position to cause either of the points 25 or 26 to engage the work and to return the latter to its proper position relative to the feed direction of the machine, in substantially the same manner as in the case of Fig. 1. In place of a single solenoid, two solenoids may be provided as shown in Fig. 1, each serving to operate one of the impaling points 25 and 26 by way of a biased or polarized relay controlled by the output current of the photoelectric cell.

In order to enable an adjustment of the slit 22 relative to the feed line passing through the needle 5, and to enable a seam to be stitched at varying distances from the border of the work piece, the top 6 may be provided with a relatively large slot covered by a light transmitting plate 32, while the position of the light slit is controlled by displacing a slidable plate 33 provided with a slit 33a. In addition, the mirror 31 may be rotatable and part or all of the adjustable elements connected with each other and synchronized in order to correctly align the light beam of the source 20 with the photoelectric cell 21. Thus, the slide 33 carrying the condenser 34 may be operatively connected with the mirror 31, to enable a quick and ready adjustment of the device, to suit any existing operating conditions and requirements.

In order to render the system independent of the ambient illumination, the character of the light of source 20 and the photoelectric cell 21 may be coordinated, such as by using an incendescent lamp together with a potassium or cesium antimony cell or by using a cesium cell in combination with fluorescent lighting, or any other suitable combination known to those skilled in the art.

The photoelectric feed control according to Figs. 2 to 4 is especially suitable for relatively soft work pieces which make it impossible to use a mechanical feeler or scanning device as shown by Fig. 1. Alternatively, the work may be applied to a support or template having a contour conforming with the work contour or a separate template may be used independently of the work together with either a mechanical or photoelectric pick-up device, to automatically produce any stitching pattern or equivalent operation upon a work piece along a desired trace or curve.

In the foregoing, the invention has been described with reference to a specific illustrative device. It will be evident, however, that variations and modifications, as well as the substitution of known elements and devices for those shown herein for illustration, may be made without departing from the broader scope and spirit of the invention, as set forth in the appended claim. The specification and drawings are accordingly to be regarded in an illustrative rather than in a restrictive sense.

I claim:

1. In a sewing or the like machine having a needle and feed dog mechanism to normally advance the work being sewn along a predetermined feeding line, a control system comprising a pair of retractable impaling members having impaling points arranged closely adjacent to and at opposite sides of said needle in respect to said line, each of said members operable to engage the work being sewn to effect rotation thereof about said impaling points as centers, means to scan the contour of the work being fed through the machine, to establish a pair of electric current paths responsive to convex and concave work contour variations, respectively, in respect to a straight contour parallel to said line, and individual electrically actuatable control means for said members each connected in one of said current paths, whereby to operate said members and to rotate the work responsive to varying contour configuration thereof, to thereby cause the seam being stitched by said needle to substantially follow said contour configuration.

2. In a sewing and the like machine having a needle and feed dog mechanism to normally advance the work being sewn along a predetermined feeding line, a control system comprising a first retractable impaling member having an impaling point arranged closely adjacent to and at one side of said needle in respect to said line, a second retractable impaling member having an impaling point arranged at the opposite side of said needle and symmetrically to said first point in respect to said line, each of said members operable to engage the work being sewn, to effect rotation thereof about said impaling points as centers, means to scan the contour of the work fed through the machine, to establish a first and a second current path responsive to convex and concave work contour variations, respectively, in respect to a straight contour parallel to said line, and individual electrically actuatable control means for said members each connected in one of said current paths, whereby to operate said members and to rotate the work being sewn in response to the varying contour configuration thereof, to thereby cause the seam being stitched by said needle to substantially follow said contour configuration.

3. In a control system as claimed in claim 2, wherein said scanning means is comprised of a mechanical feeler yieldingly engaging the edge of a work piece passed through said machine, a pair of first electrical contacts each connected in one of said current paths, a further cooperating contact, a source of operating current connected thereto, and means to operate either of said first contacts into engagement with said further contact to close either of said current paths responsive to displacements of said feeler in opposite directions by convex and concave work contour variations, respectively.

4. In a control system as claimed in claim 2, wherein said needle, said impaling points and said feeler are located upon a substantially straight line.

5. In a sewing or the like machine having a needle, a presser foot and feed dog mechanism to normally advance the work being sewn along a predetermined feeding line, a control system comprising a first impaling member retractably mounted upon said presser foot and having an impaling point located closely adjacent to and at one side of said needle in respect to said feeding line, a second impaling member also retractably mounted upon said presser foot and having an impaling point located at the opposite side of said needle and symmetrically to said first impaling point in respect to said line, each of said members operable to cause the respective impaling points to engage the work being sewn, to effect a rotation thereof in opposite directions about said impaling points as centers, respectively, means to scan the contour of the work fed through the machine, to establish a first and a second current path responsive to convex and concave work contour variations, respectively, in respect to a straight contour parallel to said line, and separate electrically actuatable control means for said members each connected in one of said current path, whereby to operate said members and to rotate the work being sewn in response to varying contour configuration thereof, to thereby cause the seam being stitched by said needle to substantially follow said contour configuration.

6. In a sewing or the like machine having a needle and feed dog mechanism to normally advance the work being sewn along a predetermined feeding line, a control system comprising at least one retractable impaling member having an impaling point arranged closely adjacent to said needle and laterally of said line, said impaling point being normally disengaged from and operable to a position engaging the work, to rotate the same about said point as a center, means to scan the contour of a workpiece fed through the machine, to produce a varying electric current in response to variations of the work contour configuration, and electrically actuatable operating means for said member controlled by said current, whereby to operate said member and to rotate the work in response to work contour variations, to thereby cause the seam being stitched by said needle to substantially follow said contour configuration.

7. In a sewing or the like machine having a needle and feed dog mechanism to normally advance the work being sewn along a predetermined feeding line, a control system comprising a first retractable impaling member having an impaling point arranged closely adjacent to and at one side of said needle in respect to said line, a second retractable impaling member having an impaling point arranged at the opposite side of said needle and symmetrically to said first point in respect to said line, electrically actuatable operating means to cause either of said members to engage and rotate the work being sewn about said impaling points as centers, means to scan the contour of the work fed through the machine, to produce an electric current energizing said actuating means and varying in response to convex and concave work contour configuration in respect to a linear contour parallel to said feeding line, whereby to operate said member and to rotate the work being sewn in response to changes of said contour configuration, to thereby cause the seam being stitched by said needle to substantially follow said contour configuration.

8. In a sewing or the like machine having a needle and feed dog mechanism to normally advance the work being sewn along a predetermined feeding line, a control system comprising at least one retractable impaling member having an impaling point arranged closely adjacent to said needle with the line connecting said needle and said point being at right angle to said line, said member being operable to a position with said impaling point engaging the work being sewn, to rotate the same about said point as a center, means to scan the contour of a work piece passed through the machine to produce an electric current varying in response to changes of work contour configuration, and electrically actuatable operating means for said member controlled by said current, to operate said member and to rotate the work being sewn in response to varying work contour configuration, to thereby cause the seam being stitched by said needle to substantially follow said work contour configuration.

9. In a control system as claimed in claim 8, said scanning means being comprised of means to produce a radiant energy beam intercepted by the edge of the work piece and a photoelectric device impinged by said beam to produce a varying output current responsive to the work contour variations.

References Cited in the file of this patent

UNITED STATES PATENTS

| | | |
|---|---|---|
| 754,320 | Kiesewetter et al. | Mar. 8, 1904 |
| 1,396,447 | McDonald | Nov. 8, 1921 |
| 1,482,907 | Brooks et al. | Feb. 5, 1924 |
| 2,290,123 | Wilfong | July 14, 1942 |
| 2,588,386 | Hubbard et al. | Mar. 11, 1952 |